United States Patent Office 2,983,768
Patented May 9, 1961

2,983,768

HYDROCARBON SEPARATION

Earle C. Makin, Jr., El Dorado, Ark., assignor to Monsanto Chemical Company, St. Louis, Mo., a corporation of Delaware No Drawing. Filed June 3, 1959, Ser. No. 817,716

8 Claims. (Cl. 260—674)

This invention relates to a method of treatment of a complex mixture of hydrocarbons.

It is an object of this invention to provide a very simple and efficient process for separating hydrocarbons of differing degrees of aromaticity. It is a particular object of this invention to provide an improved process for separating aromatic hydrocarbons from non-aromatic hydrocarbons contained in mixtures thereof. Additional objects will become apparent from the description of this invention.

According to this invention, hydrocarbons of differing degrees of aromaticity contained in mixtures thereof are separated from each other by contacting said hydrocarbon mixture with cyanoethylated polysaccharides. The following examples illustrate this invention.

Example I

Approximately 20 grams of cyanoethylated rayon containing approximately 3.0 cyanoethyl groups per glucose unit were tamped into a ½" x 20" glass column to form a firmly packed bed of cyanoethylated rayon. A mixture of n-heptane and toluene, 50% by volume of each, was then allowed to trickle downwardly through the bed at a temperature of approximately 25° C. The effluent from the bottom of the column contained 59 volume percent of n-heptane indicating that toluene had been selectively absorbed by the cyanoethylated rayon.

Example II

In accordance with the procedure described in Example I cyanoethylated cotton yarn containing 5% by weight of nitrogen (0.7 cyanoethyl groups per glucose unit) was packed into the column. A mixture of n-hexane and benzene, 50% by volume of each, was allowed to trickle through the bed at a temperature of approximately 25° C. The effluent contained 64.5 volume percent of n-hexane indicating that the benzene had been selectively absorbed by the cyanoethylated cotton yarn. After all of the material had passed through the bed, methanol was passed through the bed at a temperature of approximately 25° C. to remove the hydrocarbon absorbed by the cyanoethylated cotton. The hydrocarbon fraction was then separated from the methanol and found to contain 79.5 volume percent benzene.

Example III

The procedure set forth in Example II was repeated using cotton yarn identical to that employed in Example II except that it had not been cyanoethylated. A mixture of n-hexane and benzene, 50 volume percent of each, was allowed to trickle through the bed at a temperature of approximately 25° C. The effluent was found to contain 50 volume percent of n-hexane and 50 volume percent of benzene. The uncyanoethylated cotton yarn did not indicate any selective absorption for the aromatic or non-aromatic compound contained in the mixture.

Example IV

The procedure set forth in Example I was repeated utilizing cyanoethylated cotton yarn containing 12.3% nitrogen (2.6 cyanoethyl groups per glucose unit). A mixture of n-hexane and benzene, 50 volume percent of each, was trickled through the bed at a temperature of approximately 25° C. The effluent contained 73.9 volume percent of n-hexane indicating an outstanding selective absorbency of the cyanoethylated cotton yarn for benzene.

Example V

The procedure set forth in Example I is repeated utilizing cyanoethylated cornstarch containing 2.0 cyanoethyl groups per glucose unit. A mixture of n-hexane and benzene, 50 volume percent of each, is trickled through the bed at a temperature of approximately 25° C. The aromatics contained in the hydrocarbon mixture are selectively absorbed by the cyanoethylated starch.

In practicing the novel process of this invention, any cyanoethylated polysaccharide can be used as the process is not limited to the use of a particular cyanoethylated polysaccharide, such as those set forth in the examples. Thus, equally advantageous results are obtained using cellulose, starch, cellodextrins, pectic substances, and so forth, which have been cyanoethylated. The various types of cellulose suitable, in addition to those mentioned in the examples, include natural fibers such as jute, ramie, linen, and so forth, regenerated cellulose such as viscose, or even partially substituted derivatives containing free hydroxyl groups such as methyl cellulose or ethyl cellulose. The starch may be of root origin, such as tapioca, or from a grain such as wheat or corn. The cyanoethylated polysaccharides used in the process of this invention can be prepared by any convenient manner well known to those skilled in the art. While all cyanoethylated polysaccharides are operable in the practice of the process of this invention, cyanoethylated cellulose and cyanoethylated starch are preferred materials to be used.

While all cyanoethylated polysaccharides have been found to exhibit some degree of selectivity in the practice of the process of this invention, it has been found particularly advantageous to employ cyanoethylated polysaccharides having a degree of substitution of from 1.0 to 3.0 cyanoethyl groups per glucose unit. If desired, under particular circumstances polysaccharides containing as few as 0.1 cyanoethyl groups per glucose unit can be employed.

The novel absorption process of this invention can be carried out over a wide temperature range, the temperature not being a critical factor. The process can be carried out at room temperature, it can be carried out at temperatures significantly below room temperature such as 0° C. or it can be carried out as high as 100° C. or 200° C. or even higher as dictated by the particular circumstances.

The hydrocarbon mixture which is to be separated can be brought into contact with the cyanoethylated cellulose in either the liquid phase or the gaseous phase. Both are operable. For practical purposes, liquid phase separations are more desirable. After the cyanoethylated cellulose has become spent, that is, it has absorbed the maximum amount of hydrocarbon that it can under the circumstances, the absorbed hydrocarbon can be very simply removed by contacting the bed with a solvent for the hydrocarbon. The particular type of solvent used is not a critical factor as long as the cyanoethylated cellulose is insoluble in the particular solvent.

The novel extraction process of this invention is used to separate hydrocarbons having varying degrees of aromaticity contained in mixtures thereof. Insofar as this invention is concerned, the degree of aromaticity of an aromatic hydrocarbon is determined solely by the type, regardless of the substituent groups, of the aromatic nuclei in the molecule. Thus, benzene, naphthalene, biphenyl, anthracene and hexane have different degrees of aromaticity for the purpose of this invention, while sec.-amylbenzene, diethylbenzene and triethylbenzene have the same degree of aromaticity for the purpose of this invention. The process of this invention is particularly well suited for the separation of aromatic hydrocarbons from mixtures thereof with non-aromatic hydrocarbons, such as in mixtures thereof with aliphatic or cycloaliphatic hydrocarbons. This is particularly exemplified by the examples wherein benzene and toluene are selectively absorbed from mixtures thereof with aliphatic hydrocarbons. The process of this invention is also well suited to the separation of naphthalenic hydrocarbons from mixtures thereof with hydrocarbons other than naphthalenic hydrocarbons. The process of this invention can also be used for the removal of naphthalenic hydrocarbons from essentially aromatic petroleum streams containing naphthalenic hydrocarbons together with aromatic hydrocarbons of a degree of aromaticity different from naphthalenic hydrocarbons. The process of this invention is also particularly suited for the separation of mononuclear hydrocarbons from polynuclear aromatic hydrocarbons.

What is claimed is:

1. A process for separating hydrocarbons of differing degrees of aromaticity contained in mixtures thereof which comprises contacting said mixture with a cyanoethylated polysaccharide.

2. The process as described in claim 1 wherein the cyanoethylated polysaccharide contains from 1.0 to 3.0 cyanoethyl groups per glucose unit.

3. The process as described in claim 2 wherein the cyanoethylated polysaccharide is cyanoethylated cellulose.

4. The process as described in claim 2 wherein the cyanoethylated polysaccharide is cyanoethylated starch.

5. A process for separating aromatic hydrocarbons from non-aromatic hydrocarbons contained in a mixture thereof which comprises contacting said mixture with a cyanoethylated polysaccharide.

6. The process as described in claim 5 wherein the cyanoethylated polysaccharide contains from 1.0 to 3.0 cyanoethyl groups per glucose unit.

7. The process as described in claim 6 wherein the cyanoethylated polysaccharide is cyanoethylated cellulose.

8. The process as described in claim 6 wherein the cyanoethylated polysaccharide is cyanoethylated starch.

References Cited in the file of this patent

UNITED STATES PATENTS

| | | |
|---|---|---|
| 2,731,401 | Karnes et al. | Jan. 17, 1956 |

FOREIGN PATENTS

| | | |
|---|---|---|
| 371,394 | Great Britain | Apr. 13, 1932 |
| 802,128 | Great Britain | Oct. 1, 1958 |